United States Patent
Staas et al.

(10) Patent No.: US 6,887,146 B2
(45) Date of Patent: May 3, 2005

(54) DUST EXTRACTION SHROUD FOR A POWER TOOL

(75) Inventors: Ernst Staas, Limburg (DE); Klaus-Dieter Arich, Huenstetten-Beuerbach (DE); Rainer Herting, Langenhan (DE); Ralf Bernhart, Idstein (DE)

(73) Assignee: Black & Decker Inc., Newark, DE (US)

( * ) Notice: Subject to any disclaimer, the term of this patent is extended or adjusted under 35 U.S.C. 154(b) by 12 days.

(21) Appl. No.: 10/799,055

(22) Filed: Mar. 12, 2004

(65) Prior Publication Data

US 2004/0192184 A1 Sep. 30, 2004

(30) Foreign Application Priority Data

Mar. 13, 2003 (GB) .............................................. 0305846

(51) Int. Cl.[7] .............................................. B23B 45/00
(52) U.S. Cl. ........................ 454/66; 144/252.1; 408/67; 454/49
(58) Field of Search ........................ 454/49, 66; 408/67, 408/56; 409/137; 144/252.1

(56) References Cited

U.S. PATENT DOCUMENTS

| 1,972,846 | A | * | 9/1934 | Kelley ......................... 175/209 |
| 2,041,689 | A | | 5/1936 | Baumeistern et al. |
| 2,082,418 | A | | 6/1937 | Palmer |
| 2,129,509 | A | * | 9/1938 | Smith ......................... 175/209 |
| 2,144,586 | A | | 1/1939 | Kelly |
| 2,145,939 | A | | 2/1939 | Markley |
| 2,483,060 | A | | 9/1949 | Niedelman et al. |
| 2,574,653 | A | | 11/1951 | Miller |
| 2,730,335 | A | | 1/1956 | Lamprecht |
| 2,829,867 | A | | 4/1958 | Brochetti |
| 3,368,633 | A | * | 2/1968 | Moates ......................... 173/60 |
| 3,850,254 | A | | 11/1974 | Hirdes |

(Continued)

FOREIGN PATENT DOCUMENTS

| DE | 25 17 926 A1 | 10/1976 |
| DE | 25 48 100 A1 | 5/1977 |
| DE | 27 05 409 | 8/1978 |
| DE | 27 41 536 A1 | 3/1979 |
| DE | 29 25 908 A1 | 1/1981 |
| DE | 29 40 362 A1 | 4/1981 |
| DE | 35 16 099 A1 | 11/1986 |
| EP | 0 434 295 A2 | 6/1991 |
| EP | 1 245 330 A2 | 10/2002 |
| FR | 2 770 991 A1 | 5/1999 |
| GB | 1 431 353 | 4/1976 |
| GB | 1 569 532 | 6/1980 |
| GB | 2 096 030 A | 10/1982 |
| WO | WO 02/18096 A1 | 3/2002 |

OTHER PUBLICATIONS

Hilti; TE 5 Dust Removal System Module; Hilti USA; located @ http://www.us.hilti.com/holus/modules/pract/prca_navigation.jsp?OID=-12011.

*Primary Examiner*—Harold Joyce
(74) *Attorney, Agent, or Firm*—Michael P. Leary; Charles E. Yocum; Adan Avala

(57) ABSTRACT

A dust extraction shroud for a drill, which surrounds a drill bit and which lies adjacent the work surface, comprises a body portion defining a first inlet adapted to engage the work surface and to surround the location at which said bit penetrates the surface. The shroud body further defines a first outlet connected to a source of suction and a third inlet for allowing the bit to pass through said body portion. A first sealing means is arranged in said third inlet for surrounding said bit and resisting the flow of air. Wherein said body portion includes at least one protruding portion defining a second inlet between said protruding portion and an adjacent part of said body, and on a side of said protruding portion remote from the first inlet. The second inlet admits air to enter said body portion and travel to the first outlet.

15 Claims, 9 Drawing Sheets

U.S. PATENT DOCUMENTS

| | | |
|---|---|---|
| 4,064,952 A | 12/1977 | Lechner |
| 4,097,176 A | 6/1978 | Wanner et al. |
| 4,101,238 A | 7/1978 | Reibetanz et al. |
| 4,184,226 A | 1/1980 | Loevenich |
| 4,192,390 A | 3/1980 | Wanner et al. |
| 4,205,728 A | 6/1980 | Gloor et al. |
| 4,207,953 A | 6/1980 | Reibetanz et al. |
| 4,250,971 A | 2/1981 | Reibetanz et al. |
| 4,256,422 A | 3/1981 | Theissig et al. |
| 4,471,844 A | 9/1984 | Gallagher |
| 4,606,092 A | 8/1986 | Henning |
| 4,693,656 A | 9/1987 | Guthrie |
| 4,710,075 A | 12/1987 | Davison |
| 4,723,338 A | 2/1988 | Otsubo |
| 4,787,794 A | 11/1988 | Guthrie |
| 4,836,720 A | 6/1989 | Hadden |
| 4,848,980 A | 7/1989 | Broussard |
| D305,607 S | 1/1990 | Andrews |
| 4,915,550 A | 4/1990 | Arai et al. |
| 4,921,375 A | 5/1990 | Famulari |
| 5,034,041 A | 7/1991 | Austin |
| 5,061,123 A | 10/1991 | Broussard |
| 5,090,499 A | 2/1992 | Cuneo |
| 5,106,242 A | 4/1992 | Obrecht et al. |
| 5,113,951 A | 5/1992 | Houben et al. |
| 5,127,775 A | 7/1992 | Broadbent et al. |
| 5,129,467 A | 7/1992 | Watanabe et al. |
| 5,199,501 A | 4/1993 | Kluber et al. |
| 5,252,010 A | 10/1993 | Obrecht et al. |
| 5,356,245 A * | 10/1994 | Hosoi et al. ............... 408/56 |
| 5,371,912 A | 12/1994 | Hall |
| 5,465,492 A | 11/1995 | Bond |
| 5,467,835 A | 11/1995 | Obermeier et al. |
| 5,577,868 A | 11/1996 | Chen |
| D376,526 S | 12/1996 | Hepburn |
| 5,688,082 A * | 11/1997 | Richardson ............... 408/67 |
| D392,531 S | 3/1998 | Richardson |
| 5,904,453 A | 5/1999 | Gavia |
| 6,145,162 A | 11/2000 | Deutschenbauer et al. |
| 6,196,775 B1 | 3/2001 | Aubin et al. |
| 6,200,075 B1 | 3/2001 | Gaskin et al. |
| 6,367,468 B1 | 4/2002 | Edwards et al. |
| 2002/0141836 A1 | 10/2002 | Ege et al. |
| 2003/0170082 A1 * | 9/2003 | Garcia et al. ............ 408/1 R |

* cited by examiner

DUST EXTRACTION SHROUD FOR A POWER TOOL

The present invention relates to a dust extraction shroud for a power tool, and to a dust extraction apparatus incorporating such a shroud. The invention relates particularly, but not exclusively, to a dust extraction shroud for a hammer drill.

BACKGROUND OF THE INVENTION

Many types of building work involve drilling into and/or demolishing walls and concrete structures, with hand held tools such as drills and combined hammer drills. Such drilling work typically involves releasing large amounts of dust. German Patent Application DE4038941 describes a dust extraction system for a portable power drill in which the drill bit passes into a shroud held flush against the wall or structure being drilled. The shroud is connected to a source of suction which removes dust from the shroud as it is being produced.

This prior art dust extraction system suffers from the drawback that the air inlets for the vacuum source are disposed very near to, or on the surface being drilled. As a result of this, the inlets can become easily blocked thereby reducing the effectiveness of the dust extractor.

BRIEF SUMMARY OF THE INVENTION

Preferred embodiments of the present invention seek to overcome the above disadvantage of the prior art. According to an aspect of the present invention, there is provided a dust extraction shroud for a power tool having a working member adapted to penetrate a surface of a workpiece, the shroud comprising a body portion defining:

at least one first inlet adapted to engage the surface of the workpiece and to surround a location at which said working member penetrates the surface;

at least one first outlet adapted to be connected to a source of suction;

at least one second inlet for enabling air to enter said body portion and travel to at least one said first outlet;

a third inlet for allowing said working member to pass through said body portion and at least one said first inlet; and first sealing means arranged in said third inlet for surrounding said working member and resisting flow of air from the interior of said body portion out of said third inlet;

wherein said body portion includes at least one protruding portion defining a respective said second inlet between said protruding portion and part of said body portion adjacent thereto, and on a side of said protruding portion remote from the or each said first inlet.

By providing a shroud with at least one second inlet (i.e. air inlet) arranged remotely from the surface being drilled, this provides the advantage that it is more difficult for the or each second inlet to become blocked with dust. This also provides the advantage that as the or each second inlet is defined between the corresponding protruding portion and the adjacent part of the body portion, the or each second inlet can be made larger than in the prior art.

At least one second inlet may be arranged on the opposite side of the working member in use from the at least one said first outlet. This provides the advantage that the airflow is directed across the working member of the tool, thus facilitating the removal of dust particles as they are produced by the working member.

The shroud may further comprise a second sealing means arranged around said first inlet. By providing a seal around the first inlet (i.e. dust inlet), this provides the advantage of greater suction, as less air is permitted to flow between the surface of the wall and the first inlet, and the advantage is also provided that the seal helps to absorb vibration caused by the power tool in use.

The first sealing means may comprise at least one brush for surrounding said working member.

The at least one said first outlet may examine a respective outlet portion having substantially uniform transverse internal and/or external cross section. This provides the advantage that the outlet portion can slide in or around a corresponding aperture, to enable easy adjustment of the shroud in dust extraction apparatus incorporating the shroud, or removal and replacement of the shroud. This enables, for example power tools of varying dimensions to be used with the dust extraction apparatus.

According to a further aspect of the present invention, there is provided a dust extraction apparatus for a power tool having a working member adapted to penetrate a surface of a workpiece, the apparatus comprising:

a housing;

at least one inlet for receiving air and/or dust;

at least one outlet for allowing air to exit said housing;

suction means provided in the housing for generating suction between the or each said inlet and the or each said outlet; and a dust extraction shroud as defined above, wherein at least one said inlet of said apparatus in use is connected to a respective said first outlet of said shroud.

The or each said inlet may be adapted to slide relative to said housing in a direction substantially parallel to a working axis of said working member. This provides the advantage that the shroud is able to stay in contact with the workpiece surface as the drill bit or hammer bit is driven into the workpiece surface, thereby extracting dust throughout the whole operation of the drill.

The or each said inlet may be connected to said housing by means of a telescopic arm. The telescopic arm may be hollow. This provides the advantage that the telescopic arm can also act as a tube through which the extracted dust is sucked, so no additional tube for dust extraction is necessary.

The apparatus may further comprise filter means for at least partially removing dust particles from air flowing from at least one said inlet to at least one said outlet. The filter means may be arranged in said housing.

The apparatus may further comprise power inlet means for receiving electrical power from the power tool. This provides the advantage that the dust extractor does not have to carry it's own power supply, thereby reducing the weight and physical dimensions of the dust extractor.

The apparatus may further comprising timer means for deactivating said apparatus a predetermined time after deactivation of the power tool. This provides the advantage that dust produced even after the tool is deactivated is removed.

According to another aspect of the present invention, there is provided a power tool comprising:

a tool housing;

an electric motor provided in the tool housing;

an output shaft adapted to be caused by said motor to actuate a working member of the power tool; and a dust extraction apparatus as defined above.

The dust extraction apparatus may be removably mountable to said power tool.

The power tool may be a drill.

The power tool may be a hammer drill.

BRIEF DESCRIPTION OF THE DRAWINGS

A preferred embodiment of the present invention will now be described, by way of example only and not in any limitative sense, with reference to the accompanying drawings in which.

DETAILED DESCRIPTION OF THE INVENTION

Figure 1:
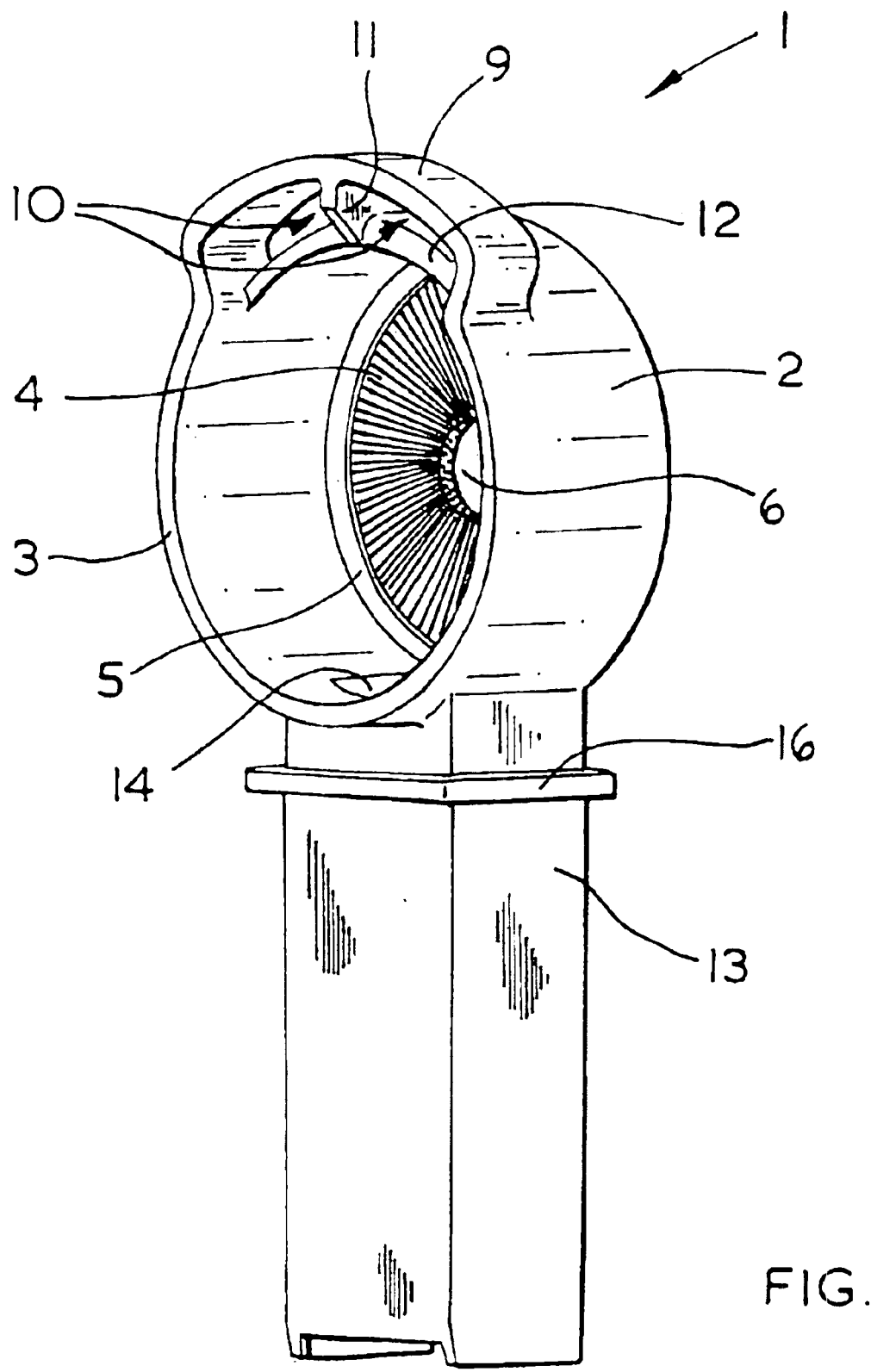
FIG. 1 is a perspective view from the front and one side of a dust extraction shroud embodying the present invention.

Referring to FIGS. 1 to 4, a dust extraction shroud 1 is formed from moulded plastic material and has a body portion 2 of substantially circular cross-section. The body portion 2 has a rim 3 adapted to be placed against a wall or other structure to be drilled. Rim 3 defines a first inlet and is substantially flat such that when placed against a wall there is little or no space between the wall and the edges of the inlet.

A circular brush 4 is disposed on the opposite side of body portion 2 to the rim 3, the bristles of brush 4 extending radially inwardly from a circular rim 5 and end at a point short of the central axis of body portion 2, such that a circular gap 6 defining a third inlet is left in the centre of the brush 4.

Figure 2:
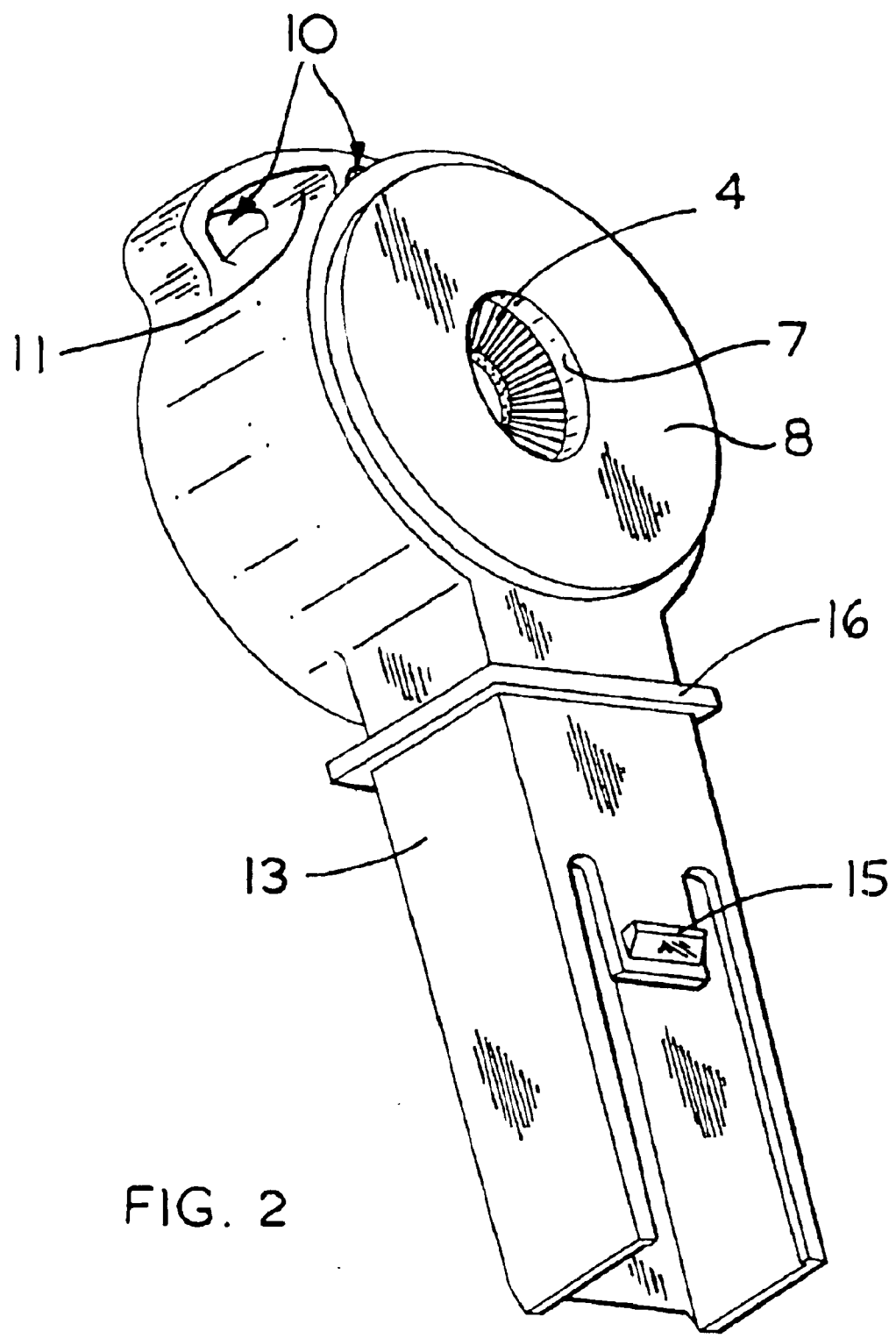
FIG. 2 is a rear perspective view from one side of the shroud of FIG. 1.
Figure 4:
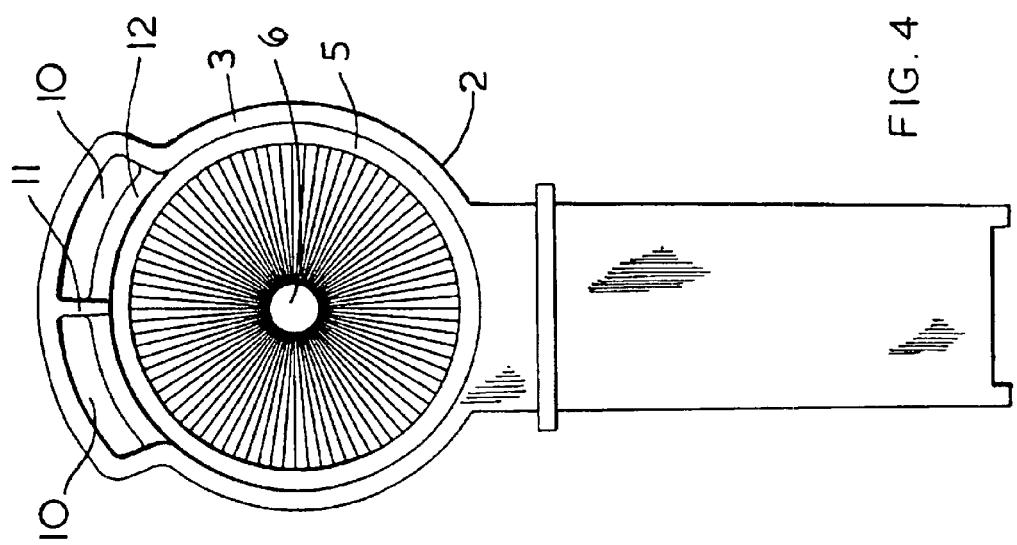
FIG. 4 is a front view of the shroud of FIG. 1.
Figure 3:
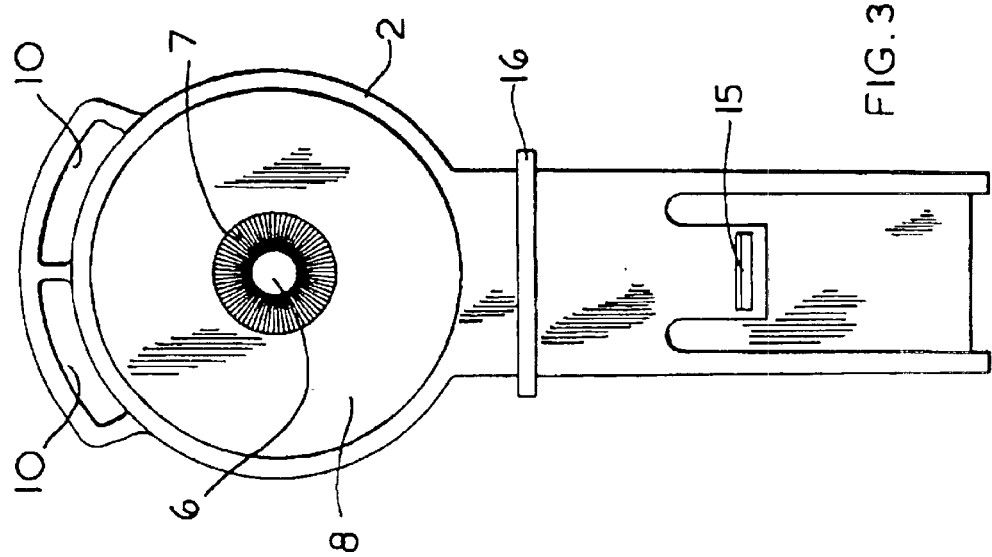
FIG. 3 is a rear view of the shroud of FIG. 1.

A circular aperture 7 is provided on rear face 8 of body portion 2, the aperture 7 being larger than the circular gap 6 in the brush 4. This feature is best shown in FIGS. 2 and 3. A drill bit (not shown) of a hammer drill, the drill bit having a substantially circular cross-section, can pass through aperture 7 and the circular gap 6 in the middle of brush 4 such that the drill bit (not shown) is able to come into contact with a wall or other surface engaged by rim 3. The brush 4 acts as a seal to firstly restrict the flow of air into body portion 2 via aperture 7, and secondly to restrict the flow of dust out of body portion 2 past the brush 4.

The body portion 2 also has a protruding collar 9 which extends outwardly from the upper surface of body portion 2. The collar 9 defines two rearwardly disposed inlets 10, separated by a supporting rib 11, between the collar 9 and the adjacent cylindrical part of body portion 2, the inlets 10 being on the side of collar 9 remote from rim 3. A shortened portion 12 of body portion 2 (this feature is best shown in FIG. 1) forms the inner surface of inlets 10. As a result of the fact that the shortened portion 12 does not extend as far forward as rim 3, the intake of air is permitted into body portion 2 through inlets 10 when the shroud 1 is pressed against a workpiece surface.

An engaging portion 13 of generally uniform rectangular cross-section extends downwardly from the bottom of body portion 2. An outlet 14 is formed in the bottom face of body portion 2 such that air is permitted to flow out of body portion 2 through hollow engaging portion 13.

Figure 5:
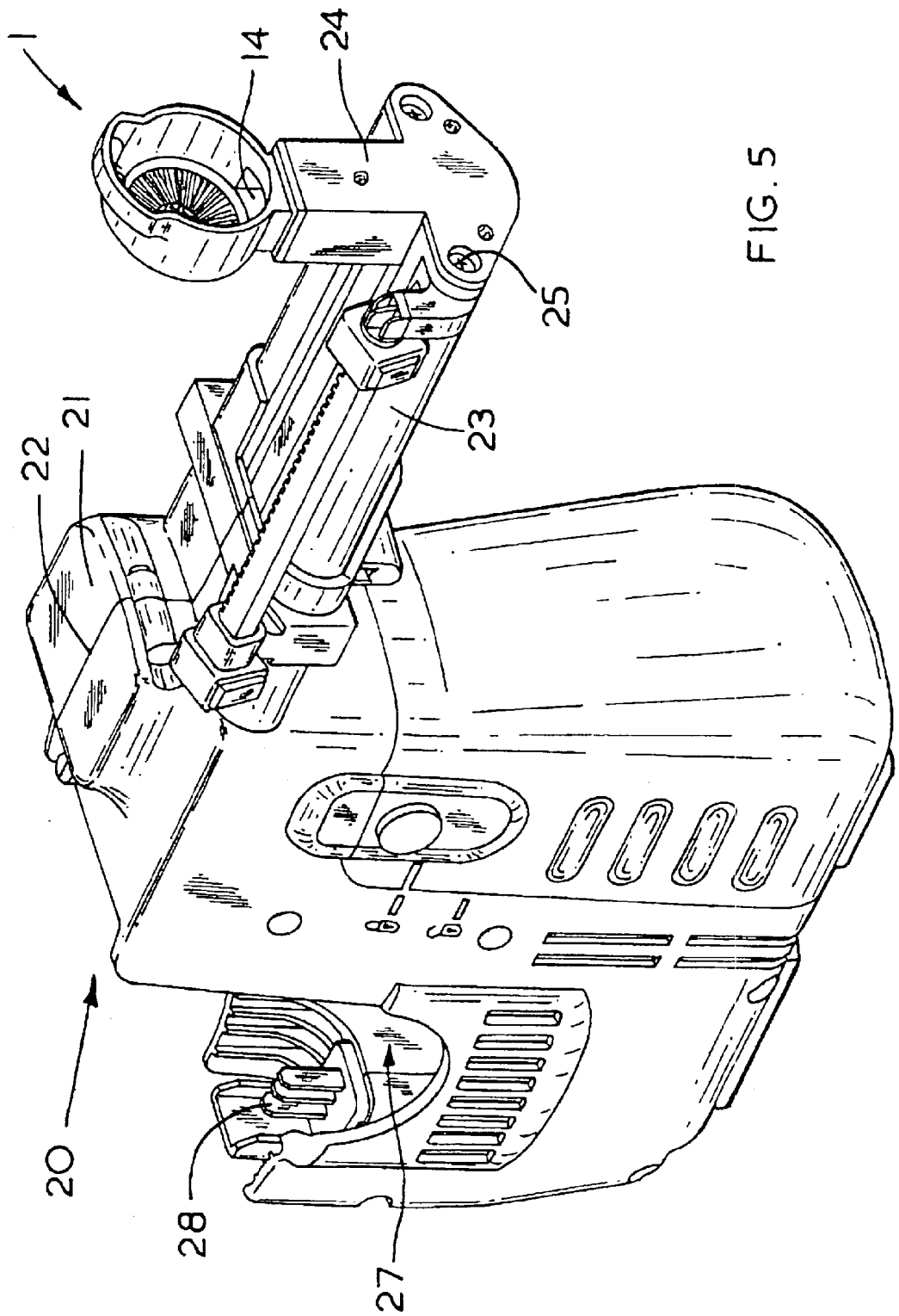
FIG. 5 is a front perspective view from one side of a dust extraction apparatus including the shroud of FIG. 1 with a telescopic arm thereof in an extended condition.

Referring to FIGS. 2 and 3, the engaging portion 13 has a generally uniform rectangular cross-section to enable the shroud 1 to be slid in and out of a corresponding rectangular receiving member 24 on a dust extraction apparatus (FIG. 5). A resilient clip 15 and a stop 16, which extends around the entire outer surface of engaging portion 13, combine to hold the shroud 1 rigidly in place in the corresponding receiving member 24. This feature will be described in more detail below.

Referring now to FIGS. 5 to 9, a dust extraction apparatus 20 incorporating the shroud 1 comprises a housing 21 of a durable plastics material formed from two clam shell halves and separated by centre line 22. This type of construction is well-known to persons skilled in the art and will not be described in further detail. The dust extraction apparatus 20 has a forwardly extending telescopic arm 23. The telescopic arm is shown fully extended in FIGS. 5, 6 and 9, and is shown fully retracted into housing 21 in FIGS. 7 and 8.

Figure 6:
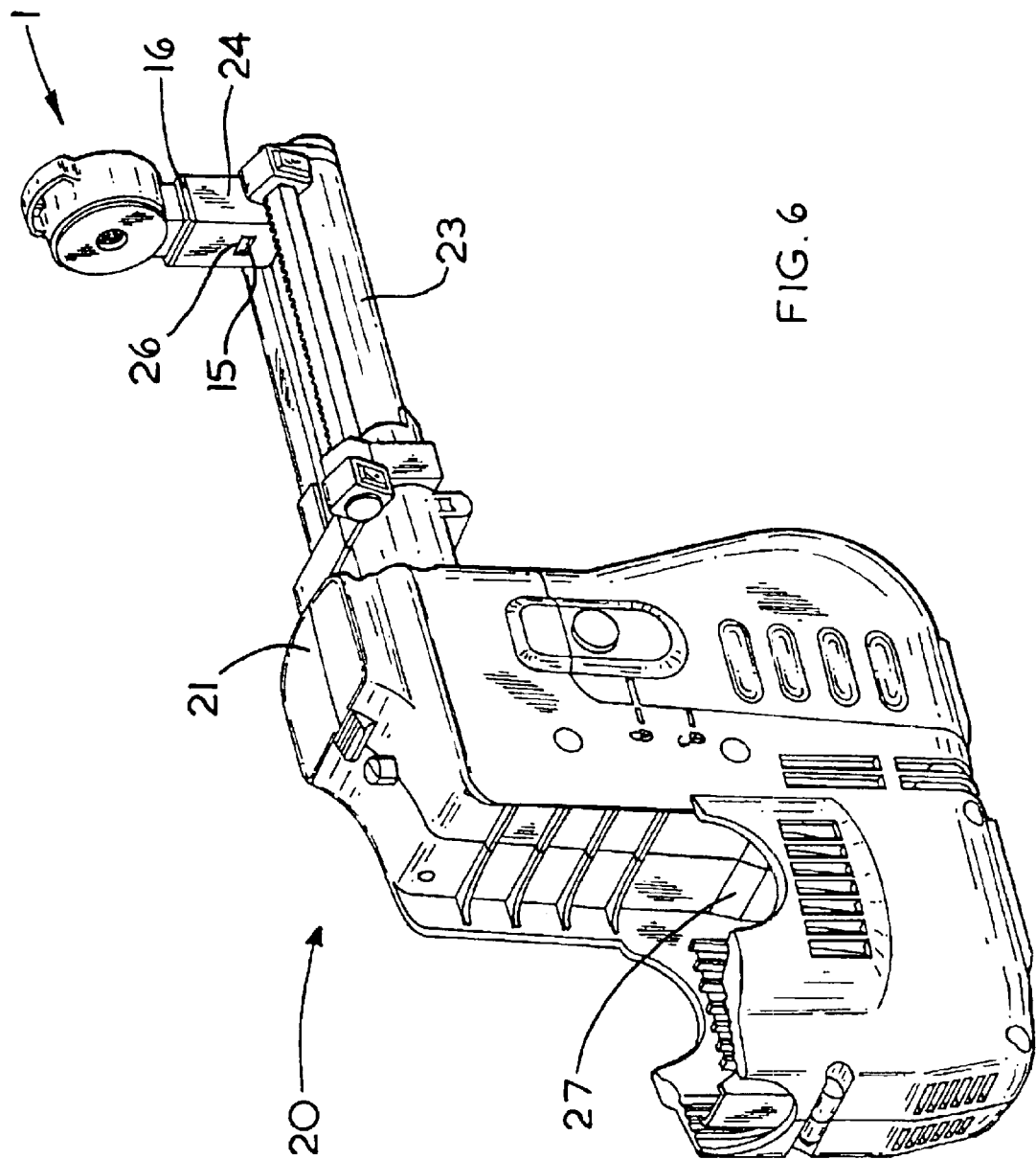
FIG. 6 is a rear perspective view from one side of the dust extraction apparatus of FIG. 5.
Figure 7:
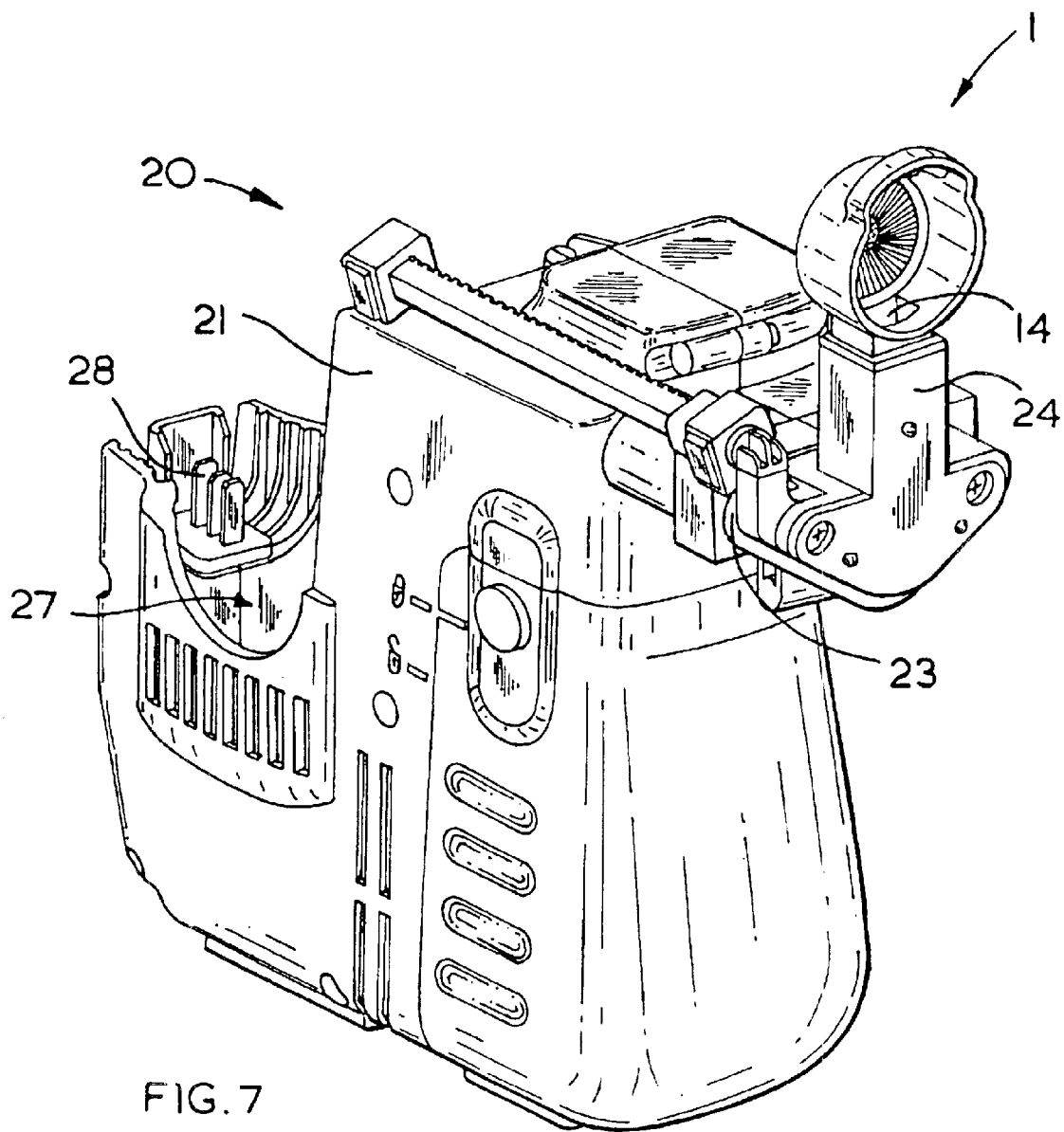
FIG. 7 is a front perspective view corresponding to FIG. 5 of the dust extraction apparatus of FIG. 5 in which the telescopic arm has been fully compressed into the housing of the apparatus.
Figure 8:
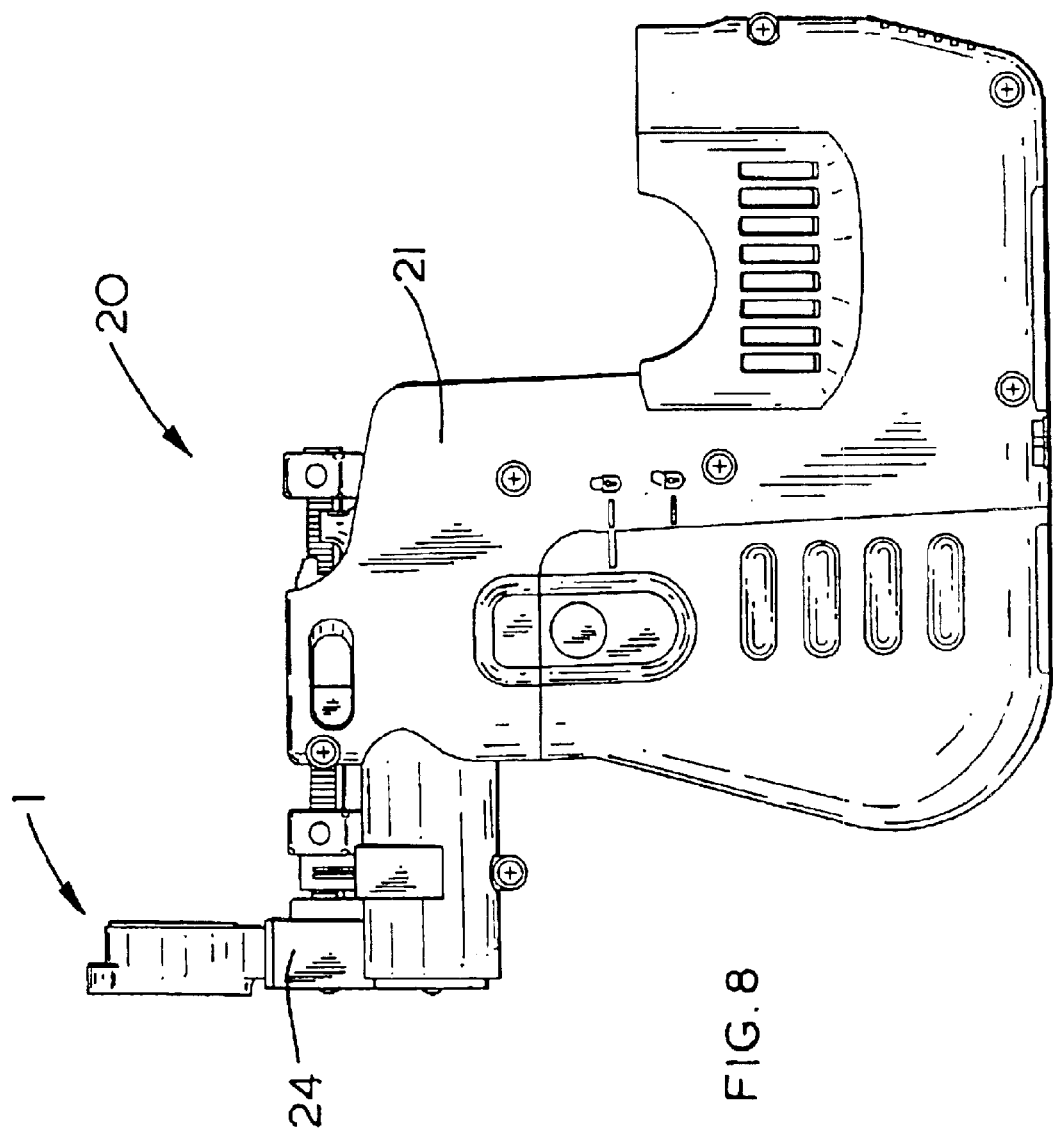
FIG. 8 is a side view of the apparatus of FIG. 7.
Figure 9:
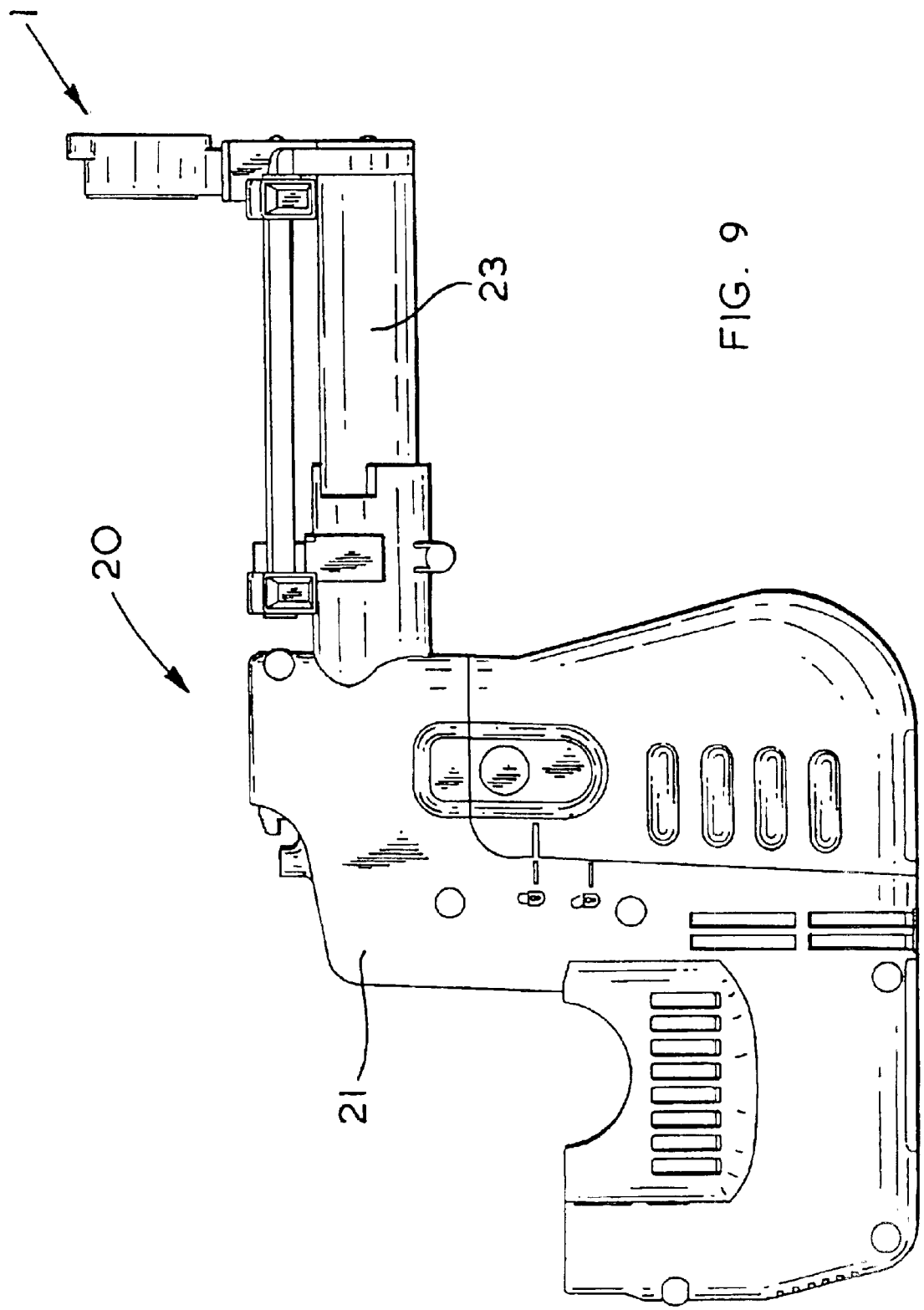
FIG. 9 is a side view of the apparatus of FIG. 5.

A receiving member 24 of generally rectangular cross-section is attached to the forward end of telescopic arm 23 by a pair of screws 25 and extends upwardly from telescopic arm 23. The engaging portion 13 (FIG. 1) of shroud 1 is formed so that it can be slidingly received in the receiving member 24. Referring specifically to FIG. 6, a rectangular aperture 26 is formed in the rear face of receiving member 24 such that resilient clip 15 of the engaging portion 13 (FIG. 2) engages aperture 26, and the stop 16 engages the upper surface of receiving member 24. In this way, it can be seen that the shroud 1 is held in place in receiving member 24 at the forward end of telescopic arm 23. In order to facilitate the release of the shroud 1, for example to replace the shroud 1 when brush 4 has worn out, a user would depress resilient clip 15 through aperture 26 allowing a user to slide the shroud 1 out of engagement with receiving member 24. It will also be appreciated by persons skilled in the art that the height of shroud 1 relative to telescopic arm 23 can be adjusted by sliding the engaging portion 13 in receiving member 24, for example to accommodate power tools (FIG. 10) of different dimensions.

The telescopic arm 23 is hollow and connected to receiving member 24. As a result of this, air is able to flow through shroud outlet 14, down through receiving member 24, through the telescopic arm 23 and into the interior of housing 21.

A fan (not shown) powered by an electric motor (not shown) disposed inside housing 21 sucks air into shroud outlet 14, and through telescopic arm 23. The air is then passed through a filter, for example a cylindrical filter, such that dust particles contained in air passing through the filter are retained inside the filter element, and the filtered air is then expelled from an outlet (not shown). This type of filter mechanism is well known to persons skilled in the art and will therefore not be described in greater detail.

The dust extraction apparatus may be removably mountable to said power tool.

The power tool may be a drill.

Figure 10:
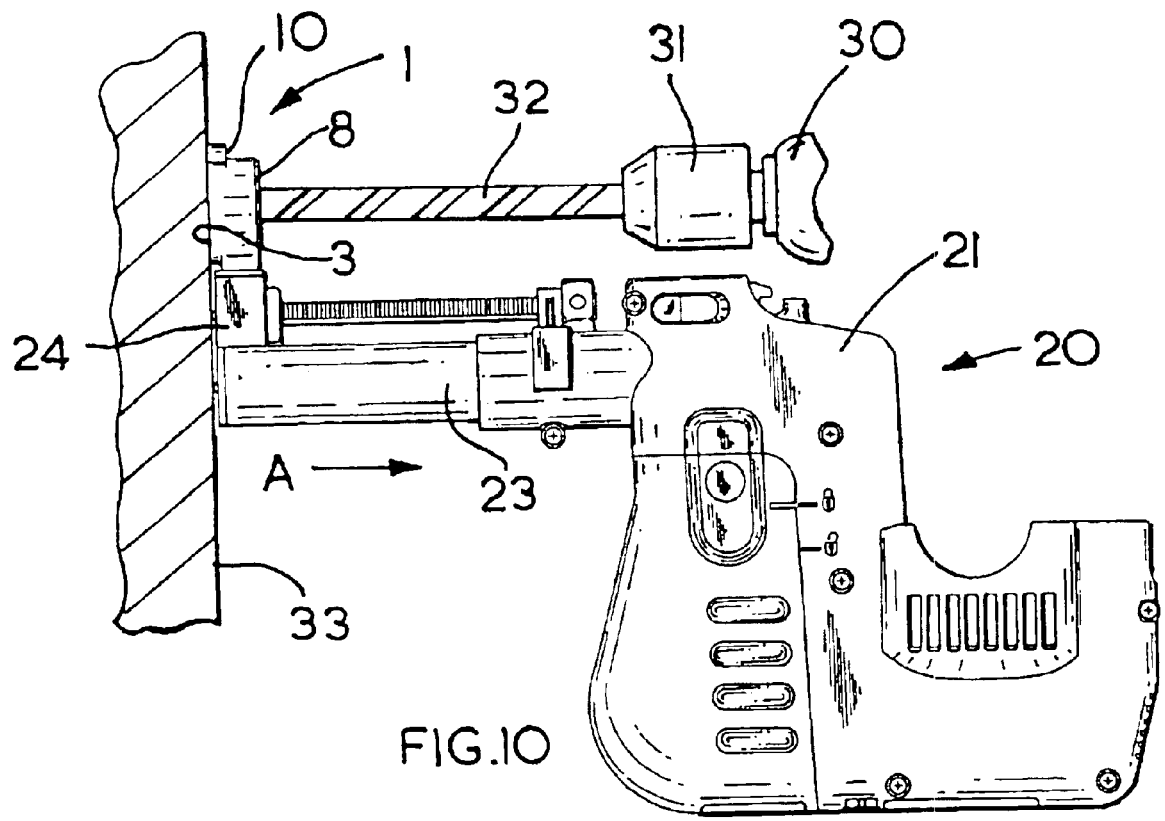
FIG. 10 is a side view of the apparatus of FIG. 9 and part of a power drill mounted thereto.
Figure 11:
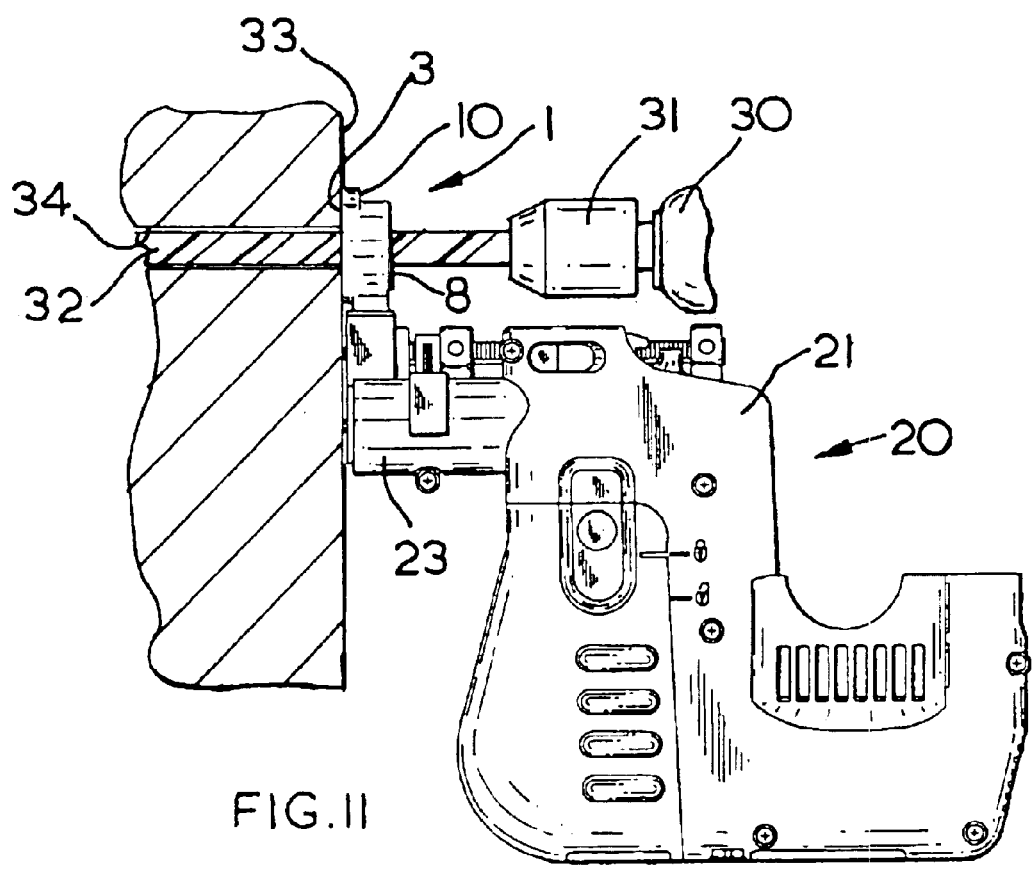
FIG. 11 is a side view corresponding to FIG. 10 of the apparatus of FIG. 8 and part of the power drill mounted thereto.

Referring now to FIGS. 10 and 11, the operation of the dust extractor when combined with a power drill will now be described.

A power drill 30 mounted to and providing power for the dust extraction apparatus 20 of FIGS. 5 to 9, includes a chuck 31 and a drill bit 32. The drill bit 32 passes into the back of shroud 1 via aperture 7 (FIG. 2) and through brush 4 (FIG. 2) such that the ends of the bristles of brush 4 contact the drill bit 32 and form a partial seal around the drill bit 32. In FIG. 10, the drill bit 32 extends forwardly so as to just contact the surface of wall 33. The shroud 1 is also in contact with wall 33 such that the 3 is held flush against the wall 33.

In the operation of the drill, as the user applies pressure and the drill bit 32 is driven into the wall 33, this causes telescopic arm 23 to retreat into the extractor housing 21. As a result of this the shroud 1 remains in contact with wall 33, whilst the drill bit 32 is permitted to penetrate wall 33. Dust produced by the action of the drill bit 32 is therefore prevented from leaving the interior of shroud 1, other than via outlet 14.

At the same time, the dust extractor 20 is in operation drawing air into inlets 10, across drill bit 32, down through receiving member 24, through telescopic arm 23 and into the interior of housing 21. In this way, the dust produced by the drill bit is removed from the immediate vicinity of drill bit 32, and filtered out of the airstream by a filter (not shown) disposed inside housing 21 such that air expelled from the dust extractor outlets (not shown) is clean.

When the required hole 34 has been drilled into wall 33, the drill is deactivated. The dust extraction apparatus 20 is provided with a timer (not shown) that continues to operate the dust extractor for a predetermined time, for example 30 seconds, after the drill has been deactivated. As the drill bit 32 is pulled out of wall 33, the telescopic arm 23 is spring-loaded such that it advances along drill bit 32 and remains in contact with wall 33. As a result of this, any dust produced after deactivation of the drill and removal of the drill bit from the wall is also removed.

It will be appreciated by persons skilled in the art that the above embodiments have been described by way of example only and not in any limitative sense, and that various alterations and modifications are possible without departure from the scope of the invention as defined by the appended claims.

What is claimed is:

1. A dust extraction shroud for a power tool having a working member adapted to penetrate a surface of a workpiece, the shroud comprising:
    a body portion defining a first inlet adapted to engage the surface of the workpiece and to surround a location at which said working member penetrates the surface;
    a first outlet adapted to be connected to a source of suction;
    a second inlet for enabling air to enter said body portion and travel to said first outlet;
    a third inlet for allowing said working member to pass through said body portion and said first inlet; and
    a first sealing means arranged in said third inlet for surrounding said working member and resisting the flow of air through said third inlet;
    wherein said body portion includes a protruding portion defining said second inlet between said protruding portion and said body portion adjacent thereto, and on a side of said protruding portion remote from said first inlet.

2. A shroud according to claim 1, further comprising second sealing means arranged around said first inlet.

3. A shroud according to claim 1, wherein said first sealing means comprises a brush for surrounding said working member.

4. A shroud according to claim 1, wherein said first outlet comprises a respective outlet portion having substantially uniform transverse internal cross section.

5. A dust extraction apparatus for a power tool having a working member adapted to penetrate a surface of a workpiece, the apparatus comprising:
    a housing;
    a suction means provided in the housing; and
    a dust extraction shroud including:
        a body portion defining a first inlet adapted to engage the surface of the workpiece and to surround a location at which said working member penetrates the surface, and including a protruding portion defining a second inlet between said protruding portion and said body portion adjacent thereto, and on a side of said protruding portion remote from said first inlet;
        a first outlet adapted to be connected to the suction means;
        a third inlet for allowing said working member to pass through said body portion and said first inlet; and
        a first sealing means arranged in said third inlet for surrounding said working member and resisting the flow of air through said third inlet;
    wherein the suction means is operable to draw air into said body portion via the second inlet, then pull the air past said working member and out of the shroud body portion via the first outlet.

6. A dust extraction apparatus according to claim 5, wherein the dust extraction shroud is adapted to slide relative to said housing in a direction substantially parallel to a working axis of said working member.

7. A dust extraction apparatus according to claim 6, wherein the shroud is connected to said housing by a telescopic arm.

8. A dust extraction apparatus according to claim 7, wherein said telescopic arm is hollow.

9. A dust extraction apparatus according to claim 5, further comprising a filter located in the housing of the dust extraction apparatus.

10. A dust extraction apparatus according to claim 5, further comprising power inlet means for receiving electrical power from the power tool.

11. A dust extraction apparatus according to claim 5, further comprising a timer for deactivating said apparatus a predetermined time after deactivation of the power tool.

12. A power tool comprising:
    a tool housing;
    an electric motor provided in the tool housing;
    an output shaft adapted to be caused by said motor to actuate a working member of the power tool;
    a dust extractor housing;
    a suction means provided in the dust extractor housing; and
    a dust extraction shroud including:
        a body portion defining a first inlet adapted to engage the surface of the workpiece and to surround a location at which said working member penetrates the surface, and including a protruding portion defining a second inlet between said protruding portion and said body portion adjacent thereto, and on a side of said protruding portion remote from said first inlet;
        a first outlet adapted to be connected to the suction means;

a third inlet for allowing said working member to pass through said body portion and said first inlet; and a first sealing means arranged in said third inlet for surrounding said working member and resisting the flow of air through said third inlet;

wherein the suction means is operable to draw air into said body portion via the second inlet, then pull the air past said working member and out of the shroud body portion into the dust extractor body via the first outlet.

13. A power tool according to claim 12, wherein the dust extractor housing is removably mountable to said power tool.

14. A power tool according to claim 12, wherein the power tool is a drill.

15. A power tool according to claim 14, wherein the power tool is a hammer drill.

* * * * *